(12) United States Patent
Earle et al.

(10) Patent No.: US 9,580,143 B2
(45) Date of Patent: Feb. 28, 2017

(54) MAGNETIC BICYCLE CHAIN RETENTION MECHANISM

(71) Applicant: Praxis Works LLC, Santa Cruz, CA (US)

(72) Inventors: David M. Earle, Watsonville, CA (US); Jordan Andrew Kestler, Pacifica, CA (US)

(73) Assignee: Praxis Works LLC, Santa Cruz, CA (US)

( * ) Notice: Subject to any disclaimer, the term of this patent is extended or adjusted under 35 U.S.C. 154(b) by 145 days.

(21) Appl. No.: 14/683,142

(22) Filed: Apr. 9, 2015

(65) Prior Publication Data

US 2015/0307156 A1 Oct. 29, 2015

Related U.S. Application Data

(60) Provisional application No. 61/978,398, filed on Apr. 11, 2014.

(51) Int. Cl.
*B62M 9/10* (2006.01)
*F16H 55/30* (2006.01)

(52) U.S. Cl.
CPC ............. *B62M 9/105* (2013.01); *F16H 55/30* (2013.01)

(58) Field of Classification Search
CPC .......... B62M 9/10; B62M 9/105; F16H 55/30
See application file for complete search history.

(56) References Cited

U.S. PATENT DOCUMENTS

2006/0063624 A1 * 3/2006 Voss .................. B62M 9/10 474/78

* cited by examiner

*Primary Examiner* — William E Dondero
*Assistant Examiner* — Robert T Reese
(74) *Attorney, Agent, or Firm* — Kolisch Hartwell, P.C.

(57) ABSTRACT

An apparatus for driving a drive chain, such as on a bicycle, may include a chainring having teeth arranged around a circumference of the chainring, and one or more magnetic portions disposed adjacent to the teeth of the chainring. The one or more magnetic portions may be disposed on the chainring and/or on a frame to which the chainring is rotatably coupled.

20 Claims, 7 Drawing Sheets

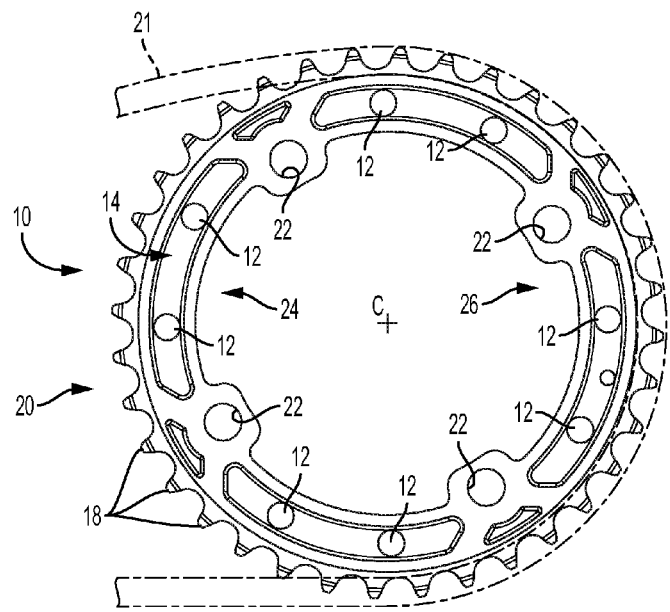
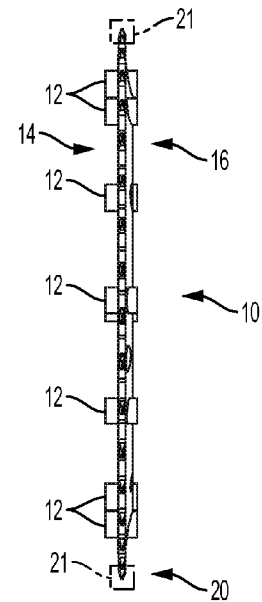
FIG. 1   FIG. 2
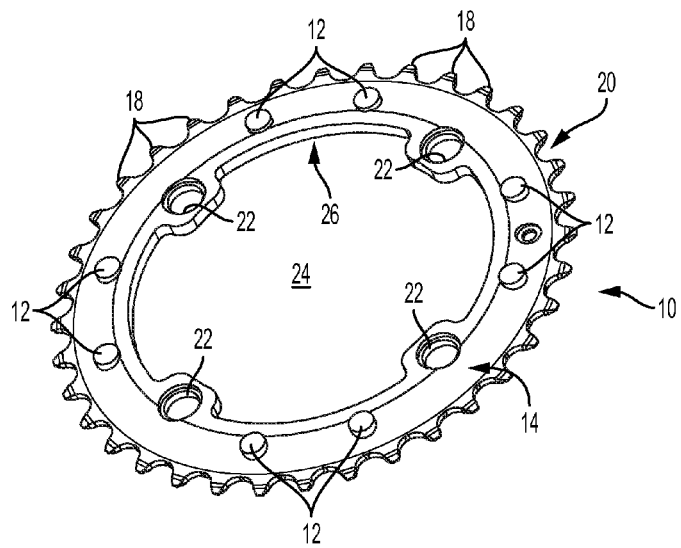
FIG. 3

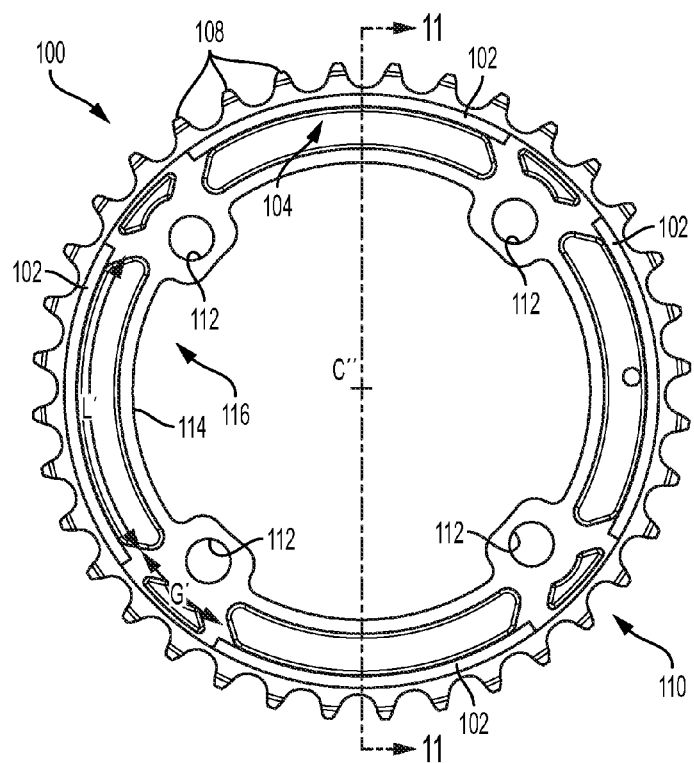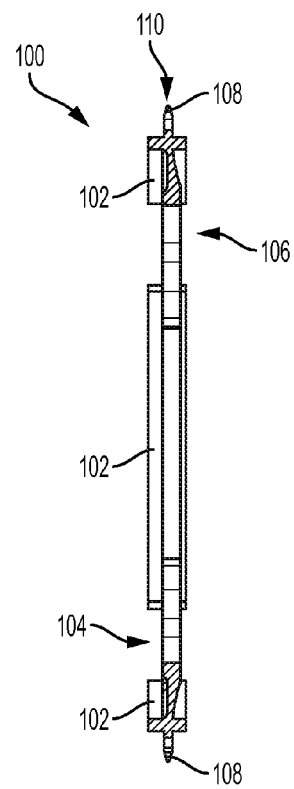
FIG. 10　　　　　FIG. 11
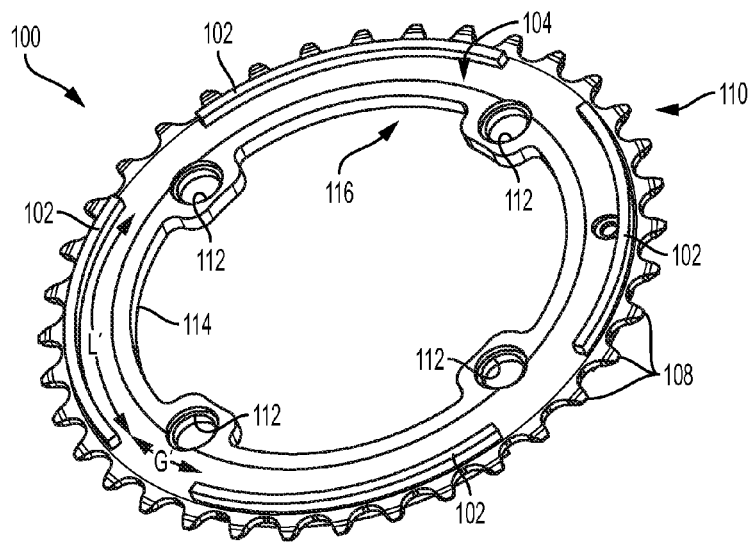
FIG. 12

_US 9,580,143 B2_

MAGNETIC BICYCLE CHAIN RETENTION MECHANISM

CROSS-REFERENCES

This application is based upon and claims the benefit under 35 U.S.C. §119(e) of U.S. Provisional Patent Application Ser. No. 61/978,398, filed Apr. 11, 2014, which is incorporated herein by reference in its entirety for all purposes.

FIELD

This disclosure relates to systems and methods relating to chain-driven vehicles. More specifically, the disclosed embodiments relate to magnetic chain retention mechanisms for chain-driven vehicles, such as bicycles and motorcycles.

INTRODUCTION

A bicycle drive train typically includes one or more front chainrings of different diameters that turn with the rider's pedaling motion, and one or more rear cogs of different diameters, connected to the chainring(s) by a chain. Rotation of the rear cogs drives rotation of the rear wheel of the bicycle. A bicycle with multiple gears may include, for example, as many as three chainrings and as many as eleven rear cogs, for a total of up to 33 different gear combinations.

A rider changes from one gear to another using a rear derailleur to shift from one rear cog to another, and a front derailleur to shift from one front chainring to another. Thus, in some cases, the rider may intend for the chain to disengage from one chainring and become engaged with another chainring. However, during operation of the bicycle, particularly when passing over rough terrain (e.g., on a mountain bike), there is a possibility that the chain will accidentally slip off its intended chainring, even though the rider did not wish to perform a shifting operation.

Unintended disengagement of the bicycle chain from a chainring can result in a temporary loss of power to the bicycle, and in some cases can even force the rider to stop the bicycle to restore the chain to its intended position by hand. In rare occurrences, the chain may become lodged between chainrings or otherwise stuck, requiring the use of tools before the bicycle can be ridden again. Accordingly, there is a need for a system that will minimize the chances that a bicycle chain will undesirably lose contact with a front chainring, while still allowing the chain to shift from one chainring to another when the rider wishes to do so.

SUMMARY

The present disclosure provides systems, apparatuses, and methods relating to magnetic bicycle chain retention mechanisms in the form of a partially magnetic chainring and/or bicycle frame. In some embodiments, an apparatus for driving a chain may include a chainring having a plurality of teeth disposed around an outer circumference of the chainring; and one or more magnetic portions attached to the chainring adjacent to a periphery of the chainring.

In some embodiments, an apparatus for driving a chain may include a chainring having a plurality of teeth disposed around an outer circumference of the chainring, the chainring being rotatably coupled to a frame; and one or more magnetic portions coupled to the frame, such that the one or more magnetic portions are adjacent to a periphery of the chainring.

In some embodiments, a method of preventing unintended disengagement of a chain from a chainring may include engaging a drive chain using a chainring having a plurality of teeth; and biasing the drive chain against disengagement from the teeth of the chainring using one or more magnetic portions disposed adjacent to a periphery of the chainring.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 1 is a front elevational view depicting a bicycle chainring with magnets disposed near the periphery of the chainring, according to aspects of the present disclosure.

FIG. 2 is a side elevational view of the chainring of FIG. 1.

FIG. 3 is an isometric view of the chainring of FIGS. 1-2.

FIG. 10 is a front elevational view depicting yet another bicycle chainring with magnets disposed near the periphery of the chainring, according to aspects of the present teachings.

FIG. 11 is a side sectional view taken through the line 11-11 in FIG. 10.

FIG. 12 is an isometric view of the chainring of FIGS. 10-11.

DESCRIPTION

Overview

Figure 4:
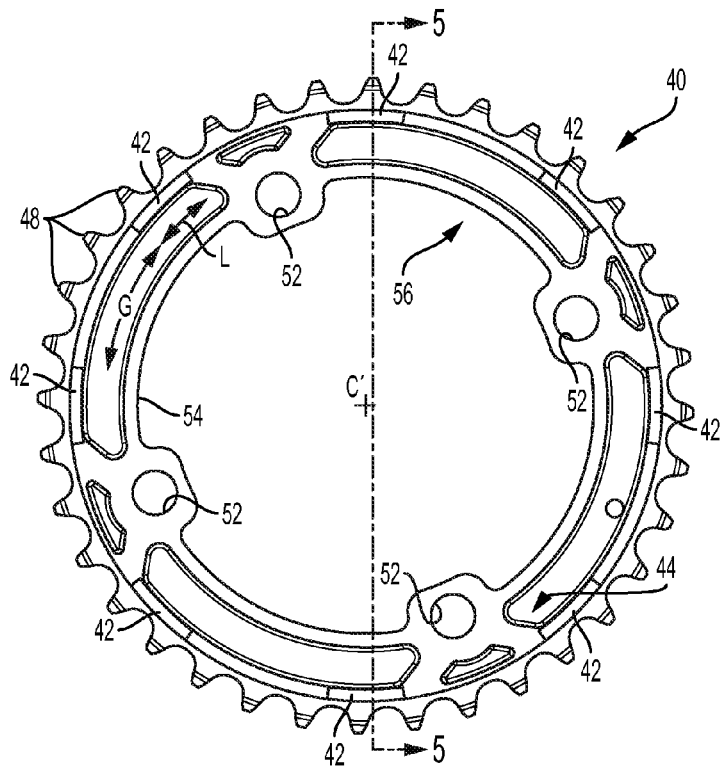
FIG. 4 is a front elevational view depicting another bicycle chainring with magnets disposed near the periphery of the chainring, according to aspects of the present disclosure.

Various embodiments of a magnetic bicycle chain retention mechanism in the form of a partially magnetic chainring and/or bicycle frame are described below and illustrated in the associated drawings. Unless otherwise specified, a magnetic chainring and/or bicycle frame and/or their various components may, but are not required to, contain at least one of the structure, components, functionality, and/or variations described, illustrated, and/or incorporated herein. Furthermore, the process steps, structures, components, functionalities, and/or variations described, illustrated, and/or incorporated herein in connection with the present teachings may, but are not required to, be included in other similar chainrings and/or bicycle frames. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

The present disclosure generally relates to a bicycle chainring having magnetic portions disposed at or near the periphery of the chainring, thereby inhibiting or preventing a bicycle chain from unintended disengagement with the chainring, while still allowing the rider to move the chain from one chainring to another using a front derailleur. The magnetic portions may be coupled to or integrated with the chainring and/or an associated bicycle frame.

One or more chainrings, interchangeably termed chain rings, sprockets, and/or chainwheels, are typically included in the drive train of a bicycle or other chain-driven apparatus. A chainring may include any suitable structure configured to transfer rotational energy from a crank arm to a drive chain. For example, a chainring may include a circular, toothed sprocket. In some examples, a chainring may have other suitable shapes, such as elliptical or oval. Chainrings may comprise steel, stainless steel, aluminum, plastic, titanium, carbon, and/or the like, or any combination of these.

A pedal and crank may be attached to one or more concentric chainrings via a spider component that may in turn be unitary with the crank and/or unitary with the chainring. In some examples, a chainring may be permanently attached to a crank arm. In some examples, a chainring may be removable. For example, each arm of the spider may be bolted to the chainring at a bolt hole on the chainring. Accordingly, a chainring may include a plurality of bolt holes arranged in a circular pattern for attaching another chainring and/or a multi-armed spider component having corresponding apertures. In some examples, a chainring may include five bolt holes to accommodate spiders having five arms. In other examples, a chainring may include four bolt holes to accommodate spiders having four arms.

An outer circumference of a chainring may include teeth configured to engage and drive a bicycle chain. Teeth may be spaced such that each link of the bicycle chain is engaged as the chainring is rotated. Teeth may be sized and shaped such that the bicycle chain is fully engaged in the driving direction, but can be selectively mechanically dislodged without significant interference. For example, a derailleur may move the chain transverse to the normal direction of chain travel in order to shift the chain onto the teeth of an adjacent chainring without the chain getting stuck on the teeth of the original chainring.

In addition to being rotatably mounted to a portion of a bicycle frame, such as a bottom bracket, the outer circumference of the chainring may be disposed in close proximity to other portions of the frame. Accordingly, portions of the frame may be within a few centimeters of the teeth and chain as the chainring rotates.

To prevent unintended disengagement of the chain from the chainring, to help disengage the chain from the chainring in a desired location or manner, and/or to position the chain on a desired portion or feature of the chainring, one or more magnets may be affixed to, incorporated into, and/or formed as an integral part of the chainring in selected locations. Accordingly, the chainring may be described as including magnetic portions. Bicycle chains are typically roller-type chains having links constructed of materials including steel or steel alloys. Accordingly, a ferrous bicycle chain will be attracted to a magnet. Suitable magnets may include permanent magnets (such as rare earth magnets, aluminum-nickel-cobalt, also known as alnico magnets, and ferrite magnets), and/or electromagnets, and/or the like, or any combination of these. The magnets may be affixed to and/or incorporated into and/or unitary with the chainring, and may be shaped, sized, and/or positioned to bias an engaged bicycle chain against unexpected disengagement. In some examples, such magnets may be additionally or alternatively disposed on the bicycle frame.

EXAMPLES, COMPONENTS, AND ALTERNATIVES

The following Examples describe selected aspects of exemplary chainrings and bicycle frames having magnetic portions as well as related systems and/or methods. The examples in these sections are intended for illustration and should not be interpreted as limiting the entire scope of the present disclosure. Each Example section may include one or more distinct inventions, and/or contextual or related information, function, and/or structure.

Example 1

This example describes an illustrative chainring 10 having a plurality of magnetic portions 12; see FIGS. 1-3.

In this example, chainring 10 includes a circular, ring-shaped sprocket having an outer face 14, and an inner face 16 opposite the outer face. Each face may generally define a plane, although each face may be contoured or textured, and/or include multiple levels. In some examples, one or both faces may be sloped, such that a thickness of the chainring tapers toward the outer edge of the chainring. A plurality of teeth 18 are disposed around an outer circumference 20 of the chainring. The plurality of teeth 18 may be configured to engage a drive chain 21, such as a bicycle drive chain.

A plurality of bolt holes 22 (e.g., four bolt holes) are arranged around a central opening or aperture 24. Aperture 24 generally defines an inner circumference 26 of the chainring.

Magnetic portions 12 are disposed on one or both of outer face 14 and inner face 16. Magnetic portions 12 may be arranged to protrude from one or both of the faces of the chainring and lie between inner circumference 26 and outer circumference 20. Each magnetic portion may be disposed sufficiently close to teeth 18 that the magnetic field of the magnetic portion will have a substantive effect on bicycle chain 21 when the chain is engaged with the teeth.

Magnetic portions 12 may be arranged around a periphery of the chainring. Magnetic portions 12 may be arranged at regular intervals, may be spaced from each other at substantially equal intervals, may be disposed at irregular or unequal intervals, or any combination of these (e.g., arranged in a pattern). In some examples, such as the one depicted in FIGS. 1-3, each magnetic portion 12 may be disposed at the same radial distance from a center C of chainring 10. In other examples, one or more of the magnetic portions may be at a different radial distance from center C.

In this example, each magnetic portion 12 may include a button- or disk-shaped magnet attached to chainring 10 and protruding from a face of the chainring. Each magnetic portion 12 may be attached to or incorporated into the chainring by any suitable method. In some examples, one or more magnetic portions 12 may be adhered to a face of the chainring by one or more adhesives. In some examples, one or more magnetic portions 12 may be pressed or friction-fit into a corresponding aperture, slot, or blind hole conforming to the shape of the magnetic portion. In some examples, one or more magnetic portions 12 may be threaded or locked into an opening in the chainring. In some examples, one or more magnetic portions 12 may be partially or fully encased in a magnetically transparent material, and that magnetically transparent material may be affixed to the chainring. In some examples, one or more magnetic portions 12 may include a magnetized portion of the chainring that protrudes from the chainring. In some examples, one or more magnetic portions 12 may pass through the chainring to protrude from both the inner and outer faces. In some examples, one or more magnetic portions 12 may include a surface that is flush with one or both faces of the chainring.

Example 2

Figure 5:
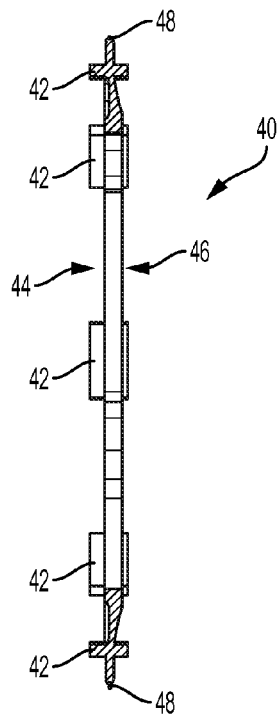
FIG. 5 is a side sectional view taken through the line 5-5 in FIG. 4.
Figure 6:
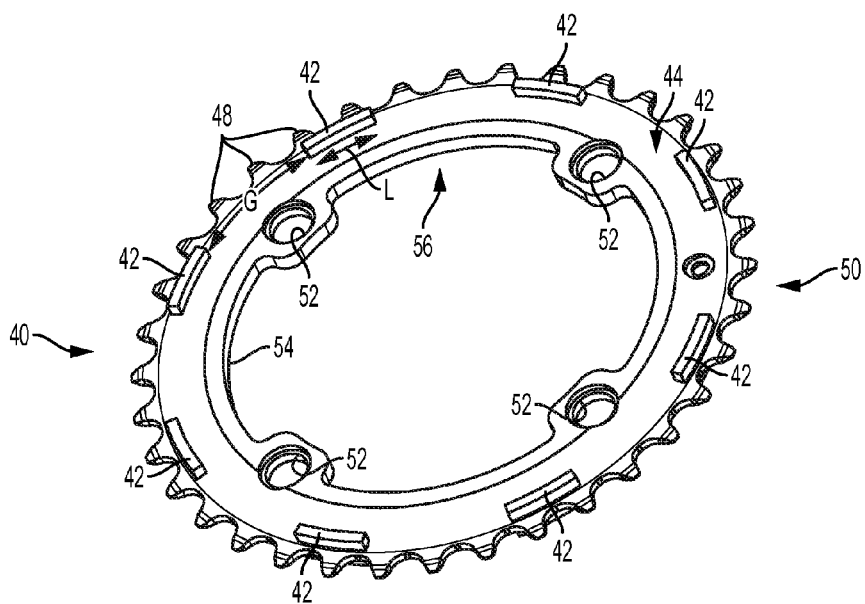
FIG. 6 is an isometric view of the chainring of FIGS. 4-5.

This example describes an illustrative chainring 40 having a plurality of magnetic portions 42; see FIGS. 4-6.

In this example, chainring 40 includes a circular, ring-shaped sprocket having an outer face 44, and an inner face 46 opposite the outer face. A plurality of teeth 48 are disposed around an outer circumference 50 of the chainring. A plurality of bolt holes 52 (e.g., four bolt holes) are arranged around a central opening or aperture 54. Aperture 54 generally defines an inner circumference 56 of the chainring. Magnetic portions 42 are disposed on one or both of outer face 44 and inner face 46. Magnetic portions 42 may be arranged to protrude from one or both of the faces of the chainring and may lie between inner circumference 56 and outer circumference 50. Each magnetic portion may be disposed sufficiently close to teeth 48 that the magnetic field of the magnetic portion will have a substantive effect on a bicycle chain engaged with the teeth.

Magnetic portions 42 may be arranged around a periphery of the chainring. Magnetic portions 42 may be arranged at regular intervals, may be spaced from each other at substantially equal intervals, may be disposed at irregular or unequal intervals, or any combination of these (e.g., arranged in a pattern). In some examples, such as the one depicted in FIGS. 4-6, each magnetic portion 42 may be disposed at the same radial distance from a center C' of chainring 40. In other examples, one or more of the magnetic portions may be at a different radial distance from center C'.

In this example, each magnetic portion 42 may include an elongate segment attached to chainring 40 and protruding from one or both faces. Magnetic portions 42 may have rectangular or rounded cross sections, or any other suitable cross section. In some examples, the elongate segments may be curved, e.g., following a curve that is concentric with the overall circular shape of the chainring. In other words, magnetic portions 42 may be curved along a segment length L to generally conform to the curvatures of the inner and/or outer circumferences of the chainring.

Magnetic portions 42 may be spaced at one or more gap lengths G. In this example, each segment has a substantially same segment length L. In this example, gap lengths G comprise two different, alternating gap lengths. As depicted in FIGS. 4 and 6, each segment length L is shorter than each gap length G between successive segments.

Each magnetic portion 42 may be attached to or integral with chainring 42 as described above regarding the magnetic portions of chainring 10.

Example 3

Figures 7, 8:
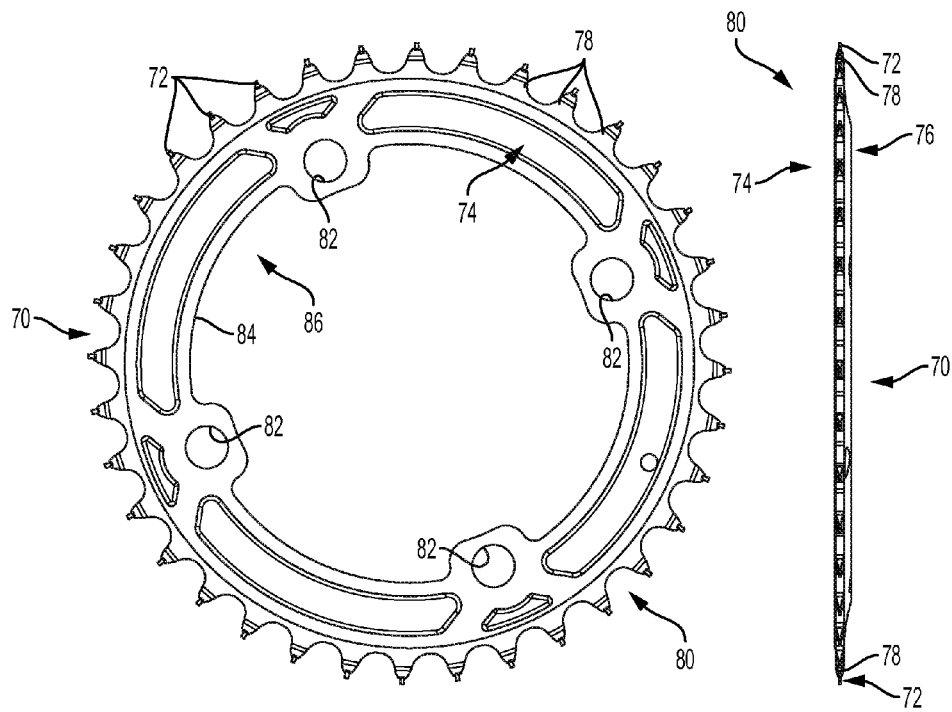
FIG. 7 is a front elevational view depicting still another bicycle chainring with magnets disposed near the periphery of the chainring, according to aspects of the present teachings.
FIG. 8 is a side elevational view of the chainring of FIG. 7.
Figure 9:
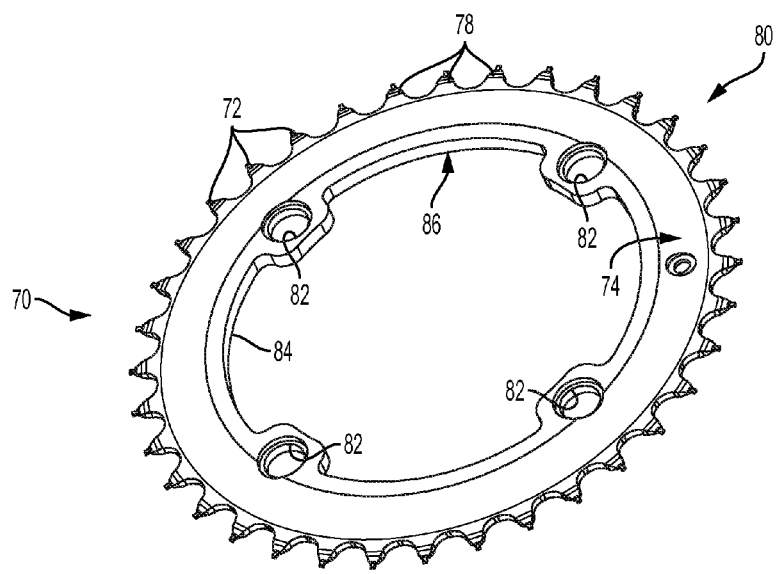
FIG. 9 is an isometric view of the chainring of FIGS. 7-8.

This example describes an illustrative chainring 70 having a plurality of magnetic portions 72; see FIGS. 7-9.

In this example, chainring 70 includes a circular, ring-shaped sprocket having an outer face 74, and an inner face 76 opposite the outer face. A plurality of teeth 78 are disposed around an outer circumference 80 of the chainring. A plurality of bolt holes 82 (e.g., four bolt holes) are arranged around a central opening or aperture 84. Aperture 84 generally defines an inner circumference 86 of the chainring. Magnetic portions 72 are disposed on one or both of outer face 77 and inner face 76. Magnetic portions 72 may be arranged to protrude from one or more teeth 78 of the chainring and may protrude from an outer tip or a land of each of the one or more teeth. In some examples, magnetic portion 72 may protrude from every tooth of the chainring. The magnetic portion may be disposed such that the magnetic field of the magnetic portion will have a substantive effect on a bicycle chain engaged with the teeth.

In this example, each magnetic portion 72 may include a magnetic segment attached to chainring 70 and protruding from one of the plurality of teeth. Magnetic portions 72 may have rectangular or rounded cross sections, or any other suitable cross section. Each magnetic portion 72 may be attached to or integral with chainring 72 as described above regarding the magnetic portions of chainring 10.

Example 4

This example describes an illustrative chainring 100 having a plurality of magnetic portions 102; see FIGS. 10-12.

In this example, chainring 100 includes a circular, ring-shaped sprocket having an outer face 102, and an inner face 106 opposite the outer face. A plurality of teeth 108 are disposed around an outer circumference 110 of the chainring. A plurality of bolt holes 112 (e.g., four bolt holes) are arranged around a central opening or aperture 114. Aperture 114 generally defines an inner circumference 116 of the chainring. Magnetic portions 102 are disposed on one or both of outer face 102 and inner face 106. Magnetic portions 102 may be arranged to protrude from one or both of the faces of the chainring and may lie between inner circumference 116 and outer circumference 110. The magnetic portion may be disposed sufficiently close to teeth 108 that the magnetic field of the magnetic portion will have a substantive effect on a bicycle chain engaged with the teeth.

Magnetic portions 102 may be arranged around a periphery of the chainring. Magnetic portions 102 may be arranged at regular intervals, may be spaced from each other at substantially equal intervals, may be disposed at irregular or unequal intervals, or any combination of these (e.g., arranged in a pattern). In some examples, such as the one depicted in FIGS. 10-12, each magnetic portion 102 may be disposed at the same radial distance from a center C'' of chainring 100. In other examples, one or more of the magnetic portions may be at a different radial distance from center C''.

In this example, each magnetic portion 102 may include an elongate segment attached to chainring 100 and protruding from one or both faces. Magnetic portions 102 may be arranged around a periphery of the chainring. Magnetic portions 102 may have rectangular or rounded cross sections, or any other suitable cross section. Magnetic portions 102 may have a segment length L'. Magnetic portions 102 may be spaced at one or more gap lengths G' between successive portions. In this example, each segment has a substantially same segment length L'. In this example, gap lengths G' are substantially equal to each other. As depicted in FIGS. 10 and 12, each segment length L' is longer than each gap length G' between successive segments. In some examples, the elongate segments may be curved, e.g., following a curve that is concentric with the overall circular shape of the chainring. In other words, magnetic portions 102 may be curved along segment length L' to generally conform to the curvatures of the inner and/or outer circumferences of the chainring. In some examples, the gaps between magnetic portions may be eliminated, resulting in a continuous ring or circular protrusion.

Each magnetic portion 102 may be attached to or integral with chainring 102 as described above regarding the magnetic portions of chainring 10.

Example 5

Figure 13:
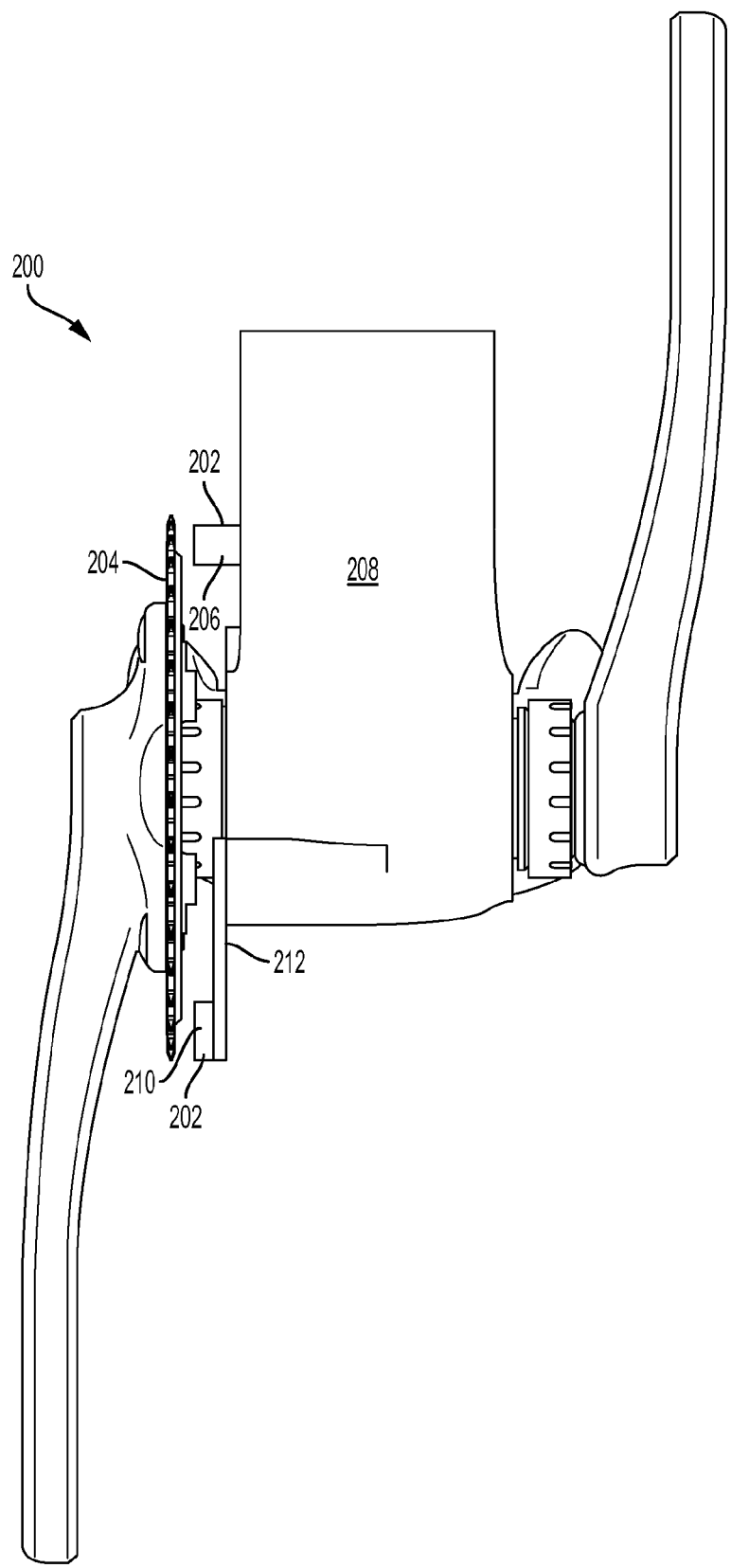
FIG. 13 is a partial front elevation view of an illustrative bicycle frame and crankset including frame-mounted magnets.
Figure 14:
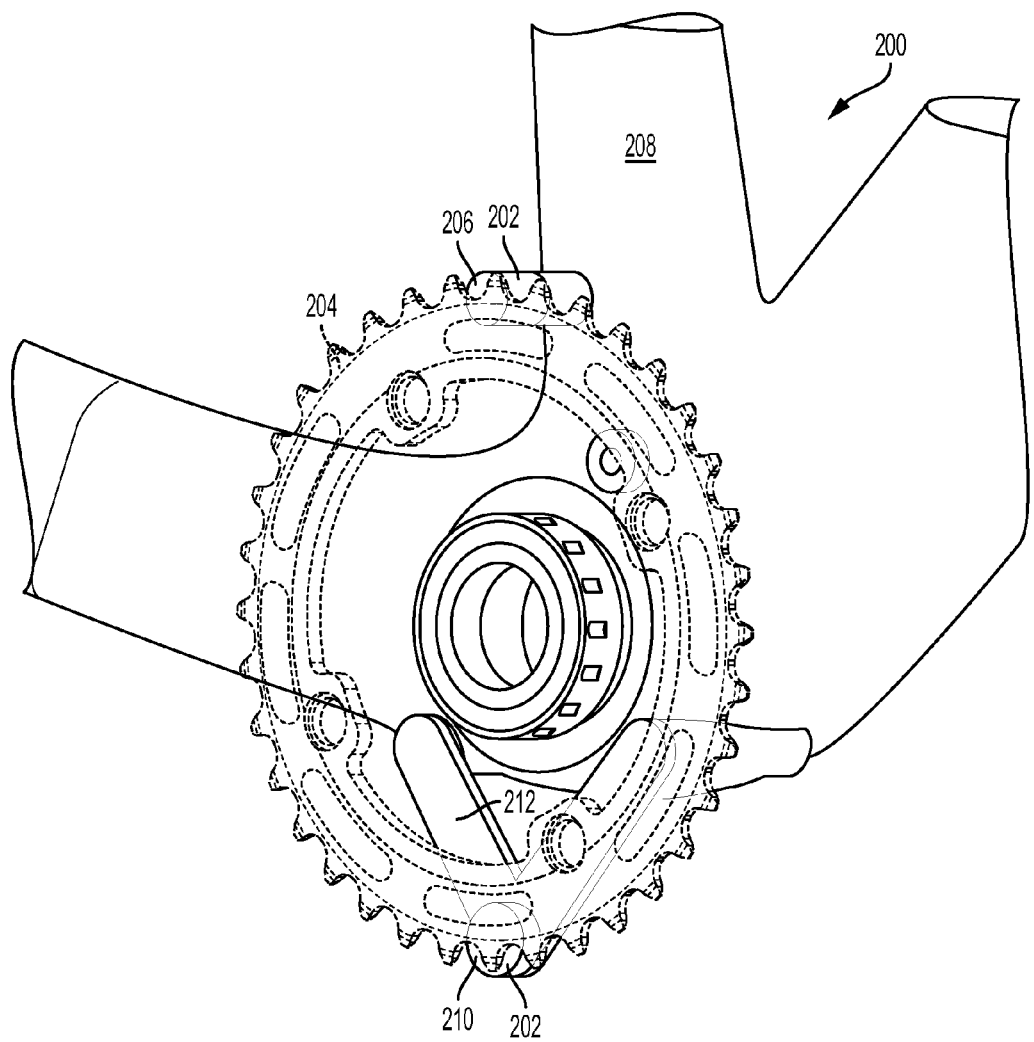
FIG. 14 is an isometric view of the apparatus of FIG. 13, with the crank arm and spider removed, and the chainring in phantom to better show placement of the magnets.

This example describes an illustrative bicycle frame 200 having one or more magnetic portions 202; see FIGS. 13-14.

In this example, FIG. 13 is a partial front elevation view of an illustrative bicycle bottom bracket and frame, showing a crankset and chainring, and magnetic portions operatively connected to the bicycle frame; FIG. 14 is an isometric view of the apparatus shown in FIG. 13, with the crank arms and spider removed, and the chainring shown in phantom.

In this example, bicycle frame 200 includes magnetic portions 202 disposed at diametrically opposed locations adjacent to a chainring 204. Two magnetic portions 202 are illustrated in this example, although more or fewer magnetic portions may be used without diverging from the principles described. As best shown in FIG. 13, an upper or first magnetic portion 206 may project from a seat tube 208 of frame 200. First magnetic portion 206 may be attached to frame 200 by any suitable structure. For example, magnetic portion 206 may be affixed to a projecting member formed as part of seat tube 208. For example, magnetic portion 206 may be affixed directly to seat tube 208, and may be shaped and sized such that the magnet projects from the frame by an appropriate amount to magnetically engage a bicycle chain. In some embodiments, magnetic portion 206 may be attached to a different part of the frame.

Chainring 204, as typical with bicycle chainrings, may extend below frame 200. A lower or second magnetic portion 210 may be operatively connected to the frame using a bracket 212. Bracket 212 may include any suitable structure configured to facilitate placement of magnetic portion 210 adjacent to chainring 204 at a location below the lower extent of the bicycle frame, such as a location opposite that of first magnetic portion 206.

Magnetic portions 202, namely magnetic portions 206 and 210, may include any suitable magnets, as described in other Examples above. Magnetic portions 202 may each be configured to magnetically attract a bicycle chain, magnetically repel a bicycle chain, or any combination thereof. In some embodiments, magnetic portions 202 may function in tandem with other magnetic portions on chainring 204, as described in the Examples 1-4. In some embodiments, magnetic portions may be included on the chainring, but magnetic portions 202 on the frame may independently provide additional or alternative functions. In some embodiments, magnetic portions may only be included on the bicycle frame.

In some embodiments, mounting brackets such as bracket 212 may be selectively movable such that the magnetic portions may be placed into and out of magnetic engagement with the bicycle chain. For example, a mounting mechanism having a magnetic portion configured to disengage the chain from the chainring may be selectively movable toward the bicycle chain when a user desires to shift the chain onto a different chainring, thereby assisting with the shifting process. Other configurations are also possible, such as moving an attractive magnet toward the chain when chain retention is desired (e.g., during rough riding conditions).

Example 6

Figure 15:
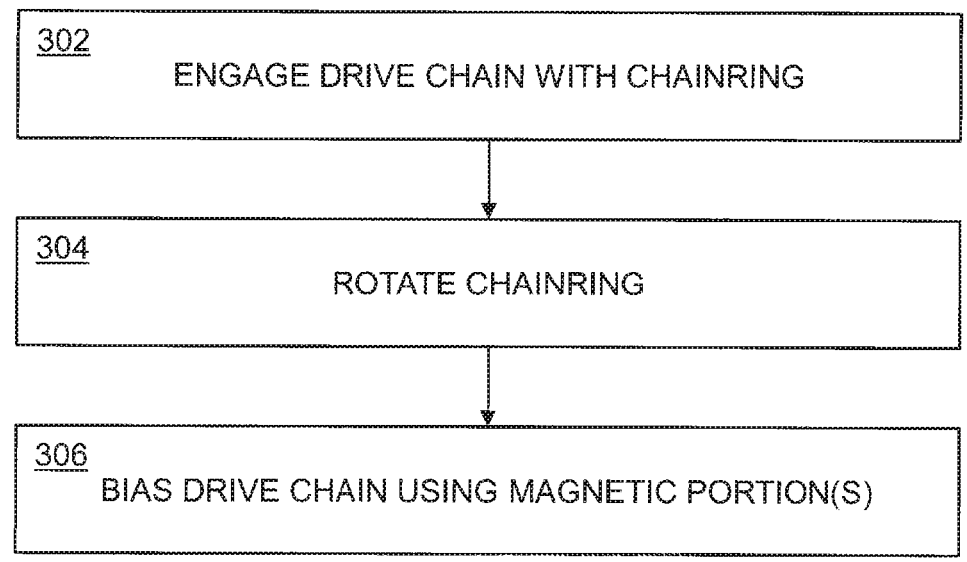
FIG. 15 is an illustrative method for biasing a chain relative to a chainring.

This section describes a method for preventing unintended disengagement of a chain from a chainring; see FIG. 15. Aspects of magnetic bicycle chain retention mechanisms, such as those described in the Examples above, may be utilized in the method steps described below. Where appropriate, reference may be made to previously described components and systems that may be used in carrying out each step. These references are for illustration, and are not intended to limit the possible ways of carrying out any particular step of the method.

FIG. 15 is a flowchart illustrating steps performed in an illustrative method, and may not recite the complete process or all steps of the method. FIG. 15 depicts multiple steps of a method, generally indicated at 300, which may be performed in conjunction with a partially magnetic chainring and/or bicycle frame according to aspects of the present disclosure. Although various steps of method 300 are described below and depicted in FIG. 15, the steps need not necessarily all be performed, and in some cases may be performed in a different order than the order shown.

Step 302 of method 300 may include engaging a drive chain with a chainring having a plurality of teeth, the teeth being disposed around an outer circumference of the chainring. As described above, a chain, such as a bicycle chain, may include ferrous components or may be entirely ferrous.

Step 304 of method 300 may include driving the drive chain by rotating the chainring (e.g., on an axle). For example, the chainring may be rotated by a user via a pedal and crank arm. In another example, the chainring may be rotated by a motor (e.g., electric motor) or engine (e.g., internal combustion engine).

Step 306 of method 300 may include biasing the drive chain using one or more magnetic portions. In some embodiments, step 306 may include biasing the drive chain against disengagement from the teeth of the chainring. For example, the magnetic portions may urge the drive chain onto the teeth of the chainring, such as by attracting the chain toward the center of the chainring, repelling the chain toward the center of the chainring, or any combination of these. The magnetic portions may bias the drive chain against lateral and/or radial displacement. In some embodiments, the magnetic portions may be attached to a periphery of the chainring. In some embodiments, the magnetic portions may be disposed on one or more portions of the bicycle frame.

Biasing the drive chain against disengagement may include attaching the one or more magnetic portions to one or more of the teeth of the chainring. Biasing the drive chain against disengagement may include attaching the one or more magnetic portions to a face of the chainring. Biasing the drive chain against disengagement may include attaching the one or more magnetic portions to a seat tube of the bicycle frame. Biasing the drive chain against disengagement may include attaching the one or more magnetic portions to a bracket that is attached to a portion of the bicycle frame. The magnetic portions may include one or more elongate segments, one or more button-like portions, and/or one or more partially or completely circumferential rings.

Biasing the drive chain using one or more magnetic portions may include biasing the drive chain toward disengagement from the chainring. For example, biasing the drive chain toward disengagement from the chainring may include biasing the drive chain toward disengagement at a certain location and/or within a certain range of locations. In some examples, biasing the drive chain toward disengagement may be done selectively, such as during intentional chain derailment (e.g., when shifting the chain onto another chainring). Biasing the drive chain toward disengagement may include moving the magnetic portions and/or mounting mechanisms thereof.

Section 4:

This section describes additional aspects and features of magnetic bicycle chain retention mechanisms in the form of a partially magnetic chainrings and/or bicycle frames, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A0. An apparatus for driving a chain, comprising:
a chainring having a plurality of teeth disposed around an outer circumference of the chainring; and
one or more magnetic portions attached to the chainring adjacent to a periphery of the chainring.

A1. The apparatus of paragraph A0, wherein each of the one or more magnetic portions protrudes from a face of the chainring.

A2. The apparatus of any of paragraphs A0 through A1, wherein each of the one or more magnetic portions has a respective magnetic field and is positioned on the chainring such that a ferrous chain engaged with the teeth of the chainring adjacent to the magnetic portion is biased by the respective magnetic field.

A3. The apparatus of any of paragraphs A0 through A2, wherein the one or more magnetic portions are configured to bias a ferrous chain engaged with the chainring against disengagement.

A4. The apparatus of paragraph A3, wherein at least one of the magnetic portions has a magnetic field configured to urge the ferrous chain onto the chainring by attracting the ferrous chain toward a center of the chainring.

A5. The apparatus of any of paragraphs A0 through A4, wherein at least one of the magnetic portions is disposed on one or more of the teeth.

A6. The apparatus of any of paragraphs A0 through A5, wherein the one or more magnetic portions are integral with the chainring.

A7. The apparatus of any of paragraphs A0 through A6, wherein the one or more magnetic portions include at least one elongate segment.

A8. The apparatus of any of paragraphs A0 through A7, further including a chain engaged by a portion of the teeth of the chainring, the chain being magnetically attracted to the one or more magnetic portions adjacent to the portion of the teeth.

B0. An apparatus for driving a chain, comprising:
a chainring having a plurality of teeth disposed around an outer circumference of the chainring, the chainring being rotatably coupled to a frame; and
one or more magnetic portions coupled to the frame, such that the one or more magnetic portions are adjacent to a periphery of the chainring.

B1. The apparatus of paragraph B0, wherein one of the magnetic portions is coupled to the frame by a bracket.

B2. The apparatus of any of paragraphs B0 through B1, wherein one of the magnetic portions is coupled to the frame by a movable mounting mechanism.

B3. The apparatus of any of paragraphs B0 through B2, further comprising one or more magnetic portions attached to the chainring.

B4. The apparatus of any of paragraphs B0 through B3, wherein the frame comprises a bicycle frame and the chainring comprises a bicycle chainring.

C0. A method of preventing unintended disengagement of a chain from a chainring, the method comprising:
engaging a drive chain using a chainring having a plurality of teeth; and
biasing the drive chain against disengagement from the teeth of the chainring using one or more magnetic portions disposed adjacent to a periphery of the chainring.

C1. The method of paragraph C0, further including driving the drive chain by rotating the chainring.

C2. The method of any of paragraphs C0 through C1, wherein biasing the drive chain against disengagement includes disposing the one or more magnetic portions on one or more of the teeth of the chainring.

C3. The method of any of paragraphs C0 through C2, wherein biasing the drive chain against disengagement includes disposing the one or more magnetic portions on a face of the chainring.

C4. The method of any of paragraphs C0 through C3, wherein biasing the drive chain against disengagement includes coupling the one or more magnetic portions to a bicycle frame.

C5. The method of any of paragraphs C0 through C4, wherein the magnetic portions include one or more elongate segments.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. An apparatus for driving a chain, comprising:
   a chainring having a plurality of teeth disposed around an outer circumference of the chainring; and
   one or more magnetic portions attached to the chainring adjacent to a periphery of the chainring.

2. The apparatus of claim 1, wherein each of the one or more magnetic portions protrudes from a face of the chainring.

3. The apparatus of claim 1, wherein each of the one or more magnetic portions has a respective magnetic field and is positioned on the chainring such that a ferrous chain engaged with the teeth of the chainring adjacent to the magnetic portion is biased by the respective magnetic field.

4. The apparatus of claim 1, wherein the one or more magnetic portions are configured to bias a ferrous chain engaged with the chainring against disengagement.

5. The apparatus of claim 4, wherein at least one of the magnetic portions has a magnetic field configured to urge the ferrous chain onto the chainring by attracting the ferrous chain toward a center of the chainring.

6. The apparatus of claim 1, wherein at least one of the magnetic portions is disposed on one or more of the teeth.

7. The apparatus of claim 1, wherein the one or more magnetic portions are integral with the chainring.

8. The apparatus of claim 1, wherein the one or more magnetic portions include at least one elongate segment.

9. The apparatus of claim 1, further including a chain engaged by a portion of the teeth of the chainring, the chain being magnetically attracted to the one or more magnetic portions adjacent to the portion of the teeth.

10. An apparatus for driving a chain, comprising:
a chainring having a plurality of teeth disposed around an outer circumference of the chainring, the chainring being rotatably coupled to a frame; and
one or more magnetic portions coupled to the frame, such that the one or more magnetic portions are adjacent to a periphery of the chainring.

11. The apparatus of claim 10, wherein one of the magnetic portions is coupled to the frame by a bracket.

12. The apparatus of claim 10, wherein one of the magnetic portions is coupled to the frame by a movable mounting mechanism.

13. The apparatus of claim 10, further comprising one or more magnetic portions attached to the chainring.

14. The apparatus of claim 10, wherein the frame comprises a bicycle frame and the chainring comprises a bicycle chainring.

15. A method of preventing unintended disengagement of a chain from a chainring, the method comprising:
engaging a drive chain using a chainring having a plurality of teeth; and
biasing the drive chain against disengagement from the teeth of the chainring using a magnetic portion disposed adjacent to a periphery of the chainring.

16. The method of claim 15, further including driving the drive chain by rotating the chainring.

17. The method of claim 15, wherein biasing the drive chain against disengagement includes disposing the magnetic portion on one or more of the teeth of the chainring.

18. The method of claim 15, wherein biasing the drive chain against disengagement includes disposing the magnetic portion on a face of the chainring.

19. The method of claim 15, wherein biasing the drive chain against disengagement includes coupling the magnetic portion to a bicycle frame.

20. The method of claim 15, wherein the magnetic portion includes an elongate segment.

* * * * *